United States Patent Office 3,708,474
Patented Jan. 2, 1973

3,708,474
NOVEL 2,2-DIMETHYL STEROIDS
Lucien Nedelec, Clichy-sous-Bois, and Jean-Claude Gasc, Bondy, France, assignors to Roussel-UCLAF, Paris, France
No Drawing. Continuation-in-part of application Ser. No. 96,254, Dec. 8, 1970, which is a continuation of application Ser. No. 737,813, June 18, 1968. This application Feb. 3, 1971, Ser. No. 112,406
Claims priority, application France, June 20, 1967, 111,158; Sept. 20, 1967, 121,655
Int. Cl. C07c *169/22, 173/00*
U.S. Cl. 260—239.55 R      12 Claims

ABSTRACT OF THE DISCLOSURE $2\alpha,2\beta,17\alpha$-trimethyl - $13\beta$ - alkyl-$\Delta^{4,9,11}$-gonatriene-$17\beta$-ol-3-ones of the formula

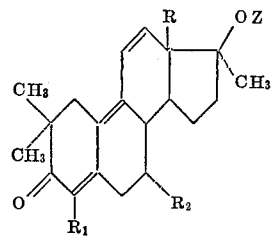

wherein Z is hydrogen, alkyl of 1 to 6 carbon atoms or tetrahydropyranyl, R is alkyl of 1 to 4 carbon atoms, $R_1$ is selected from the group consisting of hydrogen, hydroxy, lower alkanoyloxy of 1 to 7 carbon atoms and halogen, and $R_2$ is hydrogen, alkyl of 1 to 4 carbon atoms, having anti-androgenic activity and their preparation.

PRIOR APPLICATION

The present application is a continuation-in-part application of our copending, commonly assigned U.S. application Ser. No. 96,254, filed Dec. 8, 1970, which is a streamlined continuation of application Ser. No. 737,813, filed June 18, 1968, both now abandoned.

OBJECTS OF THE INVENTION

It is an object of the invention to provide novel $2\alpha,2\beta$, $17\alpha$-trimethyl-$\Delta^{4,9,11}$-gonatrienes of Formula I.

It is another object of the invention to provide novel intermediates for the $2\alpha,2\beta,17\alpha$-trimethyl-$\Delta^{4,9,11}$-gonatrienes of Formula I.

It is another object of the invention to provide novel process for the preparation of the $2\alpha,2\beta,17\alpha$-trimethyl-$\Delta^{4,9,11}$-gonatrienes of Formula I.

It is a further object of the invention to provide novel anti-androgenic compositions.

These and other objects and advantages of the invention will become obvious from the following detailed description.

THE INVENTION

The novel products of the invention are $2\alpha,2\beta,17\alpha$-trimethyl-$\Delta^{4,9,11}$-gonatriene-3-ones of the formula

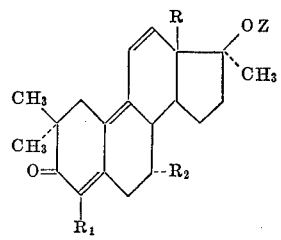

wherein Z is hydrogen, alkyl of 1 to 6 carbon atoms or tetrahydropyranyl, R is alkyl of 1 to 4 carbon atoms, $R_1$ is selected from the group consisting of hydrogen, hydroxy, lower alkanoyloxy of 1 to 7 carbon atoms and halogen, and $R_2$ is hydrogen or alkyl of 1 to 4 carbon atoms.

Examples of suitable alkyl radicals for R are methyl ethyl, propyl, isopropyl, n-butyl, sec-butyl and tert.-butyl. Examples of $R_1$ are halogens such as chlorine or bromine, hydrogen, hydroxy and alkanoyloxy such as propionyloxy, acetoxy, etc. Examples of $R_2$ are methyl, ethyl, propyl.

The process of the invention for the preparation of $\Delta^{4,9,11}$-gonatrienes of Formula I wherein R is hydrogen comprises first attaching a methyl of the carbanion of a monomethylated derivative to which also is then attached the second methyl group. The monomethylated derivative is therefore not isolated and the action of the same methylating agent permits direct formation of the desired dimethylated product. This process is best effected by reacting a $17\alpha$-methyl-$13\beta$-R-$\Delta^{4,9,11}$-gonatriene-$17\beta$-ol-3-one with a formylation agent agent in the presence of an alkali metal hydride to form the alkali metal salt of the corresponding 2-formyl-derivative and reacting the latter with a methylation agent in the presence of excess alkaline agent which forms the monomethylated derivative from which the formyl is eliminated in situ by the alkaline agent thereby forming the carbanion of the monomethylated derivative which reacts with additional methylation agent to form the gem-dimethylated derivative.

The formylation agent is preferably a lower alkyl ester of formic acid such as ethyl formate and the alkali metal hydride or alkali metal amide may be sodium or potassium hydride or amide. The methylating agent is preferably a methyl halide such as methyl iodide and the alkaline agent may be an alkali metal tert.-alcoholate such as potassium tert.-butylate or potassium tert.-amylate or an alkali metal hydride such as sodium hydride.

A variation on the process of the invention comprises forming the carbanion of the monomethylated derivative by reacting a $17\alpha$-methyl-$13\beta$-R-$\Delta^{4,9,11}$-gonatriene-3-one with a methylating agent, preferably methyl iodide, in the presence of an alkaline agent such as potassium tert.-butylate at low temperature preferably in a strongly enolizing medium, and the resulting carbanion of the mono-2-methyl derivative reacts in situ with methylating agent to add the second 2-methyl so that it is essentially a single step process.

Preferably the starting steriod and methyl iodide are added to an organic solvent such as ethyl ether or tetrahydrofuran and then the metal alcoholate is added thereto. This addition must be effected at low temperature such as $-35°$ C. to lessen the secondary reaction between methyl iodide and the alkali metal alcoholate which can occur and reduce the yield. The reaction mixture is then allowed to warm up to room temperature and the product is recovered. The reaction is effected under enolizing conditions and the presence of a strongly enolizing solvent such as hexamethyl, phosphortriamid may be beneficial.

Under these conditions, methylation of the 17β-hydroxyl group can occur to form the 17-methyl ether. This can be most advantageously avoided by forming the 17β-OZ' derivative such as 17β-tetrahydropyranyl ether by reacting the starting steroid with a blocking agent namely dihydropyran in the presence of an acidic catalyst such as p-toluene sulfonic acid. After the methylation step, the 17β-ether can be cleaved by acid hydrolysis with a mixture of water and carboxylic acids such as acetic acid and perchloric acid mixture.

The compounds of Formula I wherein $R_1$ is halogen such as bromine or chlorine can be prepared by reacting $2\alpha,2\beta,17\alpha$ - trimethyl - $13\beta$-R-$\Delta^{4,9,11}$-gonatriene-17β-ol-3-one which dihydropyran to form the corresponding 17β-tetrahydropyranyloxy derivative, reacting the latter compound with a halogenating agent such as sulfuryl chloride to form the corresponding 4-halo-17β-tetrahydropyranyloxy derivative which is then hydrolyzed under acid conditions to form the corresponding 4-halo compound of Formula I.

The latter compound can be reacted with an alkaline agent to form the corresponding 4-hydroxy compound of Formula I which can be reacted with an acylating derivative of a lower alkanoic acid of 1 to 7 carbon atoms such as the acid chloride or acid anhydride to form the corresponding 4-alkanoyloxy derivative.

The novel anti-androgenic compositions of the invention are comprised of an effective amount of at least one $2\alpha,2\beta,17\alpha$-trimethyl-$\Delta^{4,9,11}$-gonatriene-17β-ol-3-one of Formula I and a major amount of a pharmaceutical carrier. The compositions may be in the form of injectable suspensions or solutions, put up in ampoules or multiple-dose flacons, in the form of tablets, coated tablets, sublingual tablets and suppositories prepared in the usual manner.

The novel method of the invention for the treatment of hyperandrogenia in mammals comprises administering to mammals an effective amount of at least one $2\alpha,2\beta,17\alpha$-trimethyl-$\Delta^{4,9,11}$-gonatriene-17β-ol-3-one of Formula I. The said products may be administtered orally, perlingually, transcutaneously or rectally. The usual useful daily dose is 1 to 10 mg./kg. in the adult depending upon the method of administration. The said products are useful for treating acne and prostatic adenoma caused by hyperandrogenia.

In the following examples there are described several preferred embodiments to illustrate the invention. However, it should be understood that the invention is not intended to be limited to the specific embodiments.

The starting material compounds are described in U.S. patent specifications Nos. 3,248,294 and 3,453,267.

EXAMPLE I

Preparation of $2\alpha,2\beta,17\alpha$-trimethyl-$\Delta^{4,9,11}$-estratriene-17β-ol-3-one 10 gm. of 17α-methyl-$\Delta^{4,9,11}$-estratriene-17β-ol-3-one and 16 cc. of ethyl formate were introduced into 500 cc. of benzene and after 3 gm. of sodium hydride as a 50% suspension in vaseline oil were added thereto, the reaction mixture was allowed to stand for a period of 5 hours under agitation and under an inert gas at room temperature. Then the mixture was filtered and dried under vacuum to obtain 17 gm. of the sodium salt of 2-formyl-17α-methyl-$\Delta^{4,9,11}$-estratriene-17β-ol-3-one. The said product was dissolved in 65 cc. of dimethylformamide under agitation and while maintaining the temperature at 25° C. and 3.9 gm. of potassium carbonate and 25 cc. of methyl iodide were added thereto. The reaction mixture was then agitated for one hour at room temperature and then the reaction mixture was poured into water and extracted with isopropyl ether. The organic phases were washed with water, dried and evaporated to dryness to obtain 11.245 gm. of raw product which product was subjected to chromatography on silica.

1.815 gm. of the 2,2-dimethylated derivative were obtained which was purified by trituration in isopropyl ether, then by recrystallization from ethyl acetate by heating and cooling to obtain 0.839 gm. of $2\alpha,2\beta,17\alpha$-trimethyl-$\Delta^{4,9,11}$-estratriene-17β-ol-3-one melting at 139° C.

*Analysis.*—$C_{21}H_{28}O_2$; molecular weight=312.42. Calculated (percent): C, 80.73; H, 9.03. Found (percent): C, 80.85; H, 9.1.

Infrared spectra (chloroform):
    Triene complex:
        C=O at 1,667–1, 640 cm.$^{-1}$
        C=C at 1,589 cm.$^{-1}$
        OH at 3,600 cm.$^{-1}$
Ultraviolet spectra (ethanol):
    Max. at 237 m$\mu$ $\epsilon$=5,840
    Infl. towards 270 m$\mu$ $\epsilon$=3,280
    Max. at 341 m$\mu$ $\epsilon$=30,000
Circular dichroism (ethanol):
    $\Delta\epsilon_{364}$=+7.2
    $\Delta\epsilon_{325}$=−7.2
    $\Delta\epsilon_{257}$=+0.32
    $\Delta\epsilon_{235}$=−8.4

This compound is not described in the literature.

$2\alpha,2\beta,17\alpha$-trimethyl-$\Delta^{4,9,11}$-estratriene-17β-ol-3-one was characterized by its transformation into $2\alpha,2\beta,17\alpha$-trimethyl-17β-methoxy-$\Delta^{4,9,11}$-estratriene-3-one. This was effected by methylation of $2\alpha,2\beta,17\alpha$-trimethyl-$\Delta^{4,9,11}$-estratriene-17β-ol-3-one with methyl iodide and sodium hydride in a polar solvent to obtain the $2\alpha,2\beta,17\alpha$-trimethyl-17β methoxy-$\Delta^{4,9,11}$-estratriene-3-one having a melting point of 152° C. This product occurred in the form of a yellow, perfectly crystallized solid, and was soluble in ethanol and chloroform. Its specific rotation was $\alpha_D$= −57°±2° (c.=0.5% in chloroform).

Infrared spectra (ethanol):
    C=O complex at 1,656–1, 640 cm.$^{-1}$
    C=O complex at 1,578 cm.$^{-1}$
Ultraviolet spectra (ethanol):
    Max. 236 m$\mu$=5,800
    Inflection 270 m$\mu$=3,200
    Max. 340 m$\mu$=30,100

This compound is not described in the literature.

EXAMPLE II

Preparation of $2\alpha,2\beta,17\alpha$-trimethyl-$\Delta^{4,9,11}$-estratriene-17β-ol-3-one Step A: 17α-methyl-17β-tetrahydropyranyloxy-$\Delta^{4,9,11}$-estratriene-3-one.—21.7 gm. of 17α-methyl-$\Delta^{4,9,11}$-estratriene-17β-ol-3-one were introduced into 870 cc. of anhydrous ether and 30 cc. of dihydropyran and 540 mg. of p-toluene-sulfonic acid (monohydrated) were added thereto. The reaction mixture was stirred under an atmosphere of nitrogen at room temperature for a period of 23 hours after which 2.2 cc. of triethylamine were added thereto and the mixture was washed with a dilute solution of sodium bicarbonate and with water. The aqueous phases were extracted with ether and the organic phases were dried and evaporated to dryness under vacuum. The residue comprised of 17α-methyl-17β-tetrahydropyranyloxy-$\Delta^{4,9,11}$-estratriene-3-one was utilized as such for the methylation step.

This compound is not described in the literature.

Step B: 2α,2β,17α-trimethyl - 17β - tetrahydropyranyl-oxy-Δ$^{4,9,11}$-estratriene-3-one.—The product obtained in Step A was dissolved in 560 cc. of anhydrous tetrahydrofuran and placed under an atmosphere of nitrogen. 113 cc of methyl iodide were added thereto and the mixture was agitated and over an hour and a half while refrigerating the mixture to −35° C. (±5°), a solution consisting of 57 gm. of potassium tert.-butylate, 570 cc. of anhydrous tetrahydrofuran and 140 cc. of hexamethyl phosphortriamide and prepared at room temperature was introduced. The reaction mixture then was allowed to stand at room temperature for a period of about an hour after which it was poured into water, and extracted with petroleum ether. The extracts were washed with water, dried and evaporated to dryness under vacuum. The residue was comprised of 2α,2β,17α-trimethyl-17β-tetrahydropyranyl-oxy-Δ$^{4,9,11}$-estratriene-3-one which was used without further purification in the next step.

This compound is not described in the literature.

Step C: 2α,2β,17α-trimethyl-Δ$^{4,9,11}$-estratriene-17β-ol-3-one.—The residue of Step B was dissolved in 140 cc. of tetrahydrofuran under an atmosphere of nitrogen. 56 cc. of acetic acid and 11.2 cc. of concentrated perchloric acid were added thereto and the reaction mixture was allowed to stand at 25° to 30° C. for a period of two hours. Then, the reaction mixture was poured into water, and extracted with methylene chloride. The extracts were washed with water, then with normal sodium hydroxide and again with water, dried and evaporated to dryness under vacuum. The residue was crystallized from isopropyl ether, then recrystallized from ethyl ether to obtain 12.4 gm. (yield of 52%) of 2α,2β,17α-trimethyl-Δ$^{4,9,11}$-estratriene-17β-ol-3-one having a melting point of 139° C., identical with the product produced by Example I.

Starting from the mother liquors of the crystallization step, a supplementary amount of the said product was recovered by subjecting the mother liquors to chromatography through magnesium silicate and elution with methylene chloride containing 0.5% of methanol. The overall yield attained was thus 62%.

EXAMPLE III

Preparation of 2,2,17α-trimethyl-13β-ethyl-Δ$^{4,9,11}$-gonatriene-17β-ol-3-one

Step A: 13β - ethyl-17α-methyl-17β-tetrahydropyranyl-oxy-Δ$^{4,9,11}$-gonatriene-3-one.—17.1 cc. of dihydropyran and 225 mg. of p-toluene sulfonic acid monohydrate and 360 cc. of ethyl ether were added to 9 gm. of 13β-ethyl-17α-methyl-Δ$^{4,9,11}$-gonatriene-17β-ol-3-one and the reaction mixture was stirred for 23 hours under a nitrogen atmosphere. Then, 1 cc. of triethylamine was added thereto and the reaction mixture was poured into 500 cc. of a saturated aqueous sodium bicarbonate solution. The mixture was extracted with ethyl ether and the ether extracts were washed with water, dried, filtered and concentrated to dryness. The residue was constituted of 13β-ethyl-17α-methyl - 17β - tetrahydropyranyloxy-Δ$^{4,9,11}$-gonatriene-3-one and was used as is for the next step.

As far as is known, this compound is not described in the literature.

Step B: 2,2,17α-trimethyl-13β-ethyl - 17β - tetrahydropyranyloxy-Δ$^{4,9,11}$-gonatriene - 3 - one.—The product produced in Step A was dissolved in 230 cc. of tetrahydrofuran and 47 cc. of methyl iodide were added thereto. The solution was cooled to −35° C. and then a solution of 23.6 gm. of potassium tert.-butylate in 236 cc. of tetrahydrofuran and 58 cc. of hexamethyl phosphortriamide was added over 1½ hours. The reaction mixture was allowed to return to 20° C. over a one hour period and then the reaction mixture was added to 850 cc. of water. The mixture was extracted with ethyl ether and the organic extracts were washed with water, dried over sodium sulfate and evaporated to dryness under reduced pressure to obtain 2,2,17α-trimethyl-13β-ethyl-17β-tetrahydropyranyl-oxy-Δ$^{4,9,11}$-gonatriene-3-one which was used as is for the next step.

As far as is known, this compound is not described in the literature.

Step C: 2,2,17α-trimethyl-13β-ethyl-Δ$^{4,9,11}$-gonatriene-17β-ol-3-one.—The product of Step B was added to 320 cc. of acetic acid solution containing 25% by weight of water and the mixture was heated at 60° C. for 30 minutes, then was cooled and added to ice water. The mixture was extracted with methylene chloride and the organic extracts were washed with water, dried over sodium sulfate and evaporated to dryness under reduced pressure. The residue was subjected to chromatography over magnesium silicate and eluted with methylene chloride to obtain 5.1 gm. of 2,2,17α-trimethyl 13β - ethyl - Δ$^{4,9,11}$-gonatriene-17β-ol-3-one melting at 142° C. and having a specific rotation [α]$_D^{20}$=−97.5° ±2 (c.=1% in chloroform).

Analysis.—C$_{22}$H$_{30}$O$_2$; molecular weight =326.46. Calculated (percent): C, 80.93; H, 9.26. Found (percent): C, 80.6; H, 9.2.

Infrared spectrum (chloroform):
　Trienic ketone:
　　(C=O complex at 1615 and 1640 cm.$^{-1}$
　　(C=C complex at 1560 cm.$^{-1}$
　Presence of OH at 3605 cm.$^{-1}$ U.V. spectrum (ethanol):

Max. at 237 mμ E$_{1\,cm.}^{1\%}$=173

Inflextion towards 270 mμ E$_{1\,cm.}^{1\%}$=100

Max. at 342 mμ E$_{1\,cm.}^{1\%}$=928

The NMR spectrum is in accordance with the proposed structure. As far as is known, this compound is not described in the literature.

EXAMPLE IV

Preparation of 2α,2β,7α,17α-tetramethyl-Δ$^{4,9,11}$-estratriene-17β-ol-3-one

Step A: 7α,17α-dimethyl - 17β - tetrahydropyranyloxy-Δ$^{4,9,11}$-estratriene-3-one.—A mixture of 4.9 gm. of 7α,17α-dimethyl-Δ$^{4,9,11}$-estratriene-17β-ol-3-one (obtained by the process of U.S. Pat. No. 3,453,267), 147 cc. of ether, 4.9 cc. of dihydropyran and 98 mg. of p-toluene sulfonic acid was stirred at room temperature for 21 hours and then the reaction mixture was added to a saturated aqueous sodium bicarbonate solution. The mixture was extracted with ether and the organic phase was washed with water, dried over sodium sulfate, filtered and evaporated to dryness under reduced pressure. The residue was dissolved in 25 cc. of isopropyl ether and the solution was filtered through alumina. The filter was washed with isopropyl ether and the filtrate was evaporated to dryness under reduced pressure to obtain 6.3 gm. of 7α,17α-dimethyl - 17β - tetrahydropyranyloxy-Δ$^{4,9,11}$-estratriene-3-one which was used as is for the next step.

Infrared spectrum (chloroform):
　Presence of trienic ketone at 1661, 1654 and 1647 cm.$^{-1}$
　C=C at 1550 cm.$^{-1}$ and cyclic C—O—C U.V. spectrum (ethanol):

Max. at 239 mμ E$_{1\,cm.}^{1\%}$=146

Inflex. towards 271 mμ E$_{1\,cm.}^{1\%}$=90

Max. at 344 mμ E$_{1\,cm.}^{1\%}$=671 ε=25,680

As far as is known, this compound is not described in the literature.

Step B: 2,2,7α,17α-tetramethyl-17β-tetrahydropyranyl-oxy-Δ$^{4,9,11}$-estradiene-3-one.— 5.45 gm. of 7α,17α-dimethyl-17β-tetrahydropyranyloxy-Δ$^{4,9,11}$-estradiene-3-one were dissolved in 285 cc. of tetrahydrofuran and 17.85 cc. of methyl iodide were added thereto. The solution was cooled to −40° C. and a solution of 12.9 gm. of potassium tert.-butylate in 129 cc. of tetrahydrofuran was added at this temperature and the mixture was held for 10 minutes at −40° C. and then was poured into ice water. The mixture was extracted with ether and the organic phase was washed with water, dried over sodium sulfate and evaporated to dryness under reduced pressure to obtain 5.7 gm. of 2,2,7α,17α-tetramethyl - 17β - tetrahydropyranyloxy-$\Delta^{4,9,11}$-estratriene-3-one which was used as is for the next step.

As far as is known, this compound is not described in the literature.

Step C: 2,2,7α,17α-tetramethyl-$\Delta^{4,9,11}$-estratriene-17β-ol-3-one.—5.7 gm. of the product of Step B were dissolved in 114 cc. of acetic acid containing 25% of water and the solution was stirred under a nitrogen atmosphere at 60° C. for 30 minutes and was then poured with stirring into ice water. The mixture was vacuum filtered and the precipitate was washed with water and dried under vacuum. The precipitate was subjected to chromatography through silica and was eluted with a 3:1 mixture of ether-petroleum ether. The solvent was removed by evaporation and the residue was crystallized from isopropyl ether and then from a mixture of isopropylether-methanol (4:1 volumes) to obtain 2.067 gm. of 2,2,7α,17α-tetramethyl-$\Delta^{4,9,11}$-estratriene-17β-ol-3-one in the form of yellow crystals melting at 143° C. and having a specific rotation $[\alpha]_D^{20} = -240° \pm 4$ (c.=0.6% in chloroform). The crystals were soluble in chloroform and ethanol and insoluble in water.

Analysis.—$C_{22}H_{30}O_2$; molecular weight=326.46. Calculated (percent): C, 80.9; H, 9.26. Found (percent): C, 81.2; H, 9.4.

I.R. spectrum (chloroform):
Presence of trienic ketone:
C=C at 1579 cm.$^{-1}$
C=O at 1654, 1643 and 1642 cm.$^{-1}$
OH at 3598 cm.$^{-1}$ U.V. spectrum (ethanol):

Max. at 236–237 mμ $E_{1cm.}^{1\%}=178$

Inflextion towards 271 mμ $C_{1cm.}^{1\%}=106$

Max. at 342 mμ $E_{1cm.}^{1\%}=879$  ε=28,700

As far as is known, this compound is not described in the literature.

EXAMPLE V

Preparation of 2α,2β,17α-trimethyl-4-chloro-$\Delta^{4,9,11}$-estratriene-17β-ol-one Step A: 2,2,17α-trimethyl-17β-tetrahydropyranyloxy-$\Delta^{4,9,11}$-estratriene-3-one.—15 gm. of 2α,2β,17α-trimethyl-$\Delta^{4,9,11}$-estratriene-17β-ol-3-one [produced in Example II] were dissolved in 640 cc. of ether and then 16 cc. of dihydropyran and then 0.35 gm. of p-toluene sulfonic acid were added to the solution. After stirring the reaction mixture at 20° C. under an inert atmosphere for 24 hours, 7 cc. of triethylamine were added thereto and the reaction mixture was poured with agitation into an aqueous saturated sodium bicarbonate solution. The mixture was extracted with ether and the ether phase was washed with water, dried over sodium sulfate and distilled to dryness under reduced pressure to obtain 19.30 gm. of 2α,2β,17α-trimethyl - 17β - tetrahydropyranyloxy-$\Delta^{4,9,11}$-estratriene-3-one which was used as is for the next step.

As far as is known, this compound is not described in the literature.

Step B: 2α,2β,17α-trimethyl-4-chloro-17β-tetrahydropyranyloxy-$\Delta^{4,9,11}$-estratriene-3-one.—19.30 gm. of the product of Step A were dissolved in 400 cc. of pyridine and while cooling to —20° C. under an inert atmosphere, 6 cc. of sulfuryl chloride and then 25 cc. of water were added thereto. The mixture was maintained at —5° C. for 30 minutes and the reaction mixture was then added to water. The mixture was extracted with methylene chloride and the organic phase was washed with water, dried over sodium sulfate and distilled to dryness under reduced pressure to obtain 23.50 gm. of 2α,2β,17α-trimethyl-4-chloro-17β-tetrahydropyranyloxy - $\Delta^{4,9,11}$ - estratriene-3-one which was used as is for the next step.

As far as is known, this compound is not described in the literature.

Step C: 2α,2β,17α-trimethyl-4-chloro-$\Delta^{4,9,11}$-estratriene-17β-ol-3-one.—23.50 gm. of the product of Step B were dissolved in 250 cc. of acetic acid containing 25% water and the solution was heated under a nitrogen atmosphere at 75–80° C. for 20 minutes. The reaction mixture was poured into ice water and was extracted with a 1:1 mixture of ether-methylene chloride. The organic phase was washed with water until the wash waters were neutral and was evaporated to dryness under reduced pressure. The residue was subjected to chromatography over silica and eluted with a 7:3 mixture of benzene-ethyl acetate. The solvent was evaporated to obtain 11.60 gm. of 2α,2β,17α-trimethyl-4-chloro - $\Delta^{4,9,11}$ - estratriene-17β-ol-3-one melting at 175–176° C. and having a specific rotation $[\alpha]_D^{20} = +395° \pm 5$ (c.=1% in ethanol).

The product occurred in the form of slightly yellow spangles soluble in alcohols and chlorinated solvents and insoluble in water.

Analysis.—$C_{27}H_{27}ClO_2$; molecular weight=346.89. Calculated (percent): C, 72.70; H, 7.84; Cl, 10.29. Found (percent): C, 72.7; H, 7.9; Cl, 10.2.

U.V. spectrum (ethanol):

Max. at 242–243 mμ $E_{1cm.}^{1\%}=215$

Inflex. towards 278 mμ $E_{1cm.}^{1\%}=91$

Inflex. towards 291 mμ $E_{1cm.}^{1\%}=111$

Max. at 356 mμ $E_{1cm.}^{1\%}=835$  ε=28,800

I.R. spectrum (chloroform):
Presence of conjugated ketone at 1668 cm.$^{-1}$
Presence of C=C at 1538 and 1595 cm.$^{-1}$ and of

As far as is known, this compound is not described in the literature.

EXAMPLE VI

Preparation of 2α,2β,17α-trimethyl-4-ocetoxy-$\Delta^{4,9,11}$-estratriene-17β-ol-3-one 6.1 gm. of 2α,2β,17α-trimethyl-4-chloro-$\Delta^{4,9,11}$-estratriene-17β-ol-3-one was dissolved in 150 cc. of ethanol and 36 cc. of water while bubbling an inert gas therethrough and the mixture was stirred for 30 minutes at room temperature. Then, 54 cc. of sodium hydroxide solution were added thereto and the mixture was refluxed for 1½ hours while maintaining the bubbling of the inert gas. After cooling, the solution was added to an ice-water mixture and the mixture was extracted with ethyl acetate. The organic phase was washed with water until the wash waters were neutral and was then evaporated to dryness under reduced pressure. The residue which was 2α,2β,17α-trimethyl - $\Delta^{4,9,11}$ - estratriene-4,17β-diol-3-one, was added to 30 cc. of pyridine and 15 cc. of acetic acid anhydride and the mixture remained in contact for 20 hours at room temperature. The mixture was vacuum filtered and the precipitate was washed with water and dried. The residue was subjected to chromatography over silica and was eluted with a 7:3 mixture of benzene-ethyl acetate. The solution was evaporated to dryness and the residue was dissolved in 25 cc. of benzene at room temperature. The solution was filtered and the filtrate was added to 120 cc. of hot hexane. The mixture was cooled and vacuum filtered. The precipitate was dried to obtain 3.5 gm. of 2α,2β,17α-trimethyl-4-acetoxy - $\Delta^{4,9,11}$ - estratriene-17β-ol-3-one melting at 154° C. and having a specific rotation $[\alpha]_D^{20} = +239°$ (c.=0.7% in ethanol). The product occurred as yellow prisms soluble in alcohols and benzene and insoluble in water.

*Analysis.*—$C_{23}H_{30}O_4$; molecular weight=370.47. Calculated (percent): C, 74.56; H, 8.16. Found (percent): C, 74.3; H, 7.9.

I.R. spectrum (chloroform):

Presence of C=O at 1760 cm.$^{-1}$, conjugated ketone at 1668 cm.$^{-1}$, of C=C at 1582 and 1558 cm.$^{-1}$ and of

U.V. spectrum (ethanol):

Max. at 238 mμ $E^{1\%}_{1 cm.}$=187

Inflex. towards 272 mμ $E^{1\%}_{1 cm.}$=107

Max. at 347–348 mμ $E^{1\%}_{1 cm.}$=769  ε=28,500

As far as is known, this compound is not described in the literature.

EXAMPLE VII

Preparation of 2α,2β,17α-trimethyl-Δ$^{4,9,11}$-estratriene 17β-ol-3-one

Step A.—2 gm. of 3-oxo 17α-methyl 17β-hydroxy-Δ$^{4,9,11}$-estratriene was dissolved in 100 cc. of ethylic ether, 2.2 cc. of dihydropyran and 50 mg. of p-toluene sulphonic acid. The mixture was stirred during 17 hours at room temperature under inert atmosphere. Then the mixture, was neutralized by admixture of 0.2 cc. of triethylamine, washed with water and dried over sodium sulfate. After filtration, the organic solution was evaporated until dryness.

The dry residue consisting of the 17β-tetrahydropyranyl derivative weighed 3.16 gm. and was used as such in the next step.

Step B.—3.16 gm. of the residue obtained in the step A, was dissolved in 8 cc. tetrahydrofuran. To this solution, 6.15 cc. methyl iodide was added and cooled to −65° C. under inert atmosphere. A solution of 3.1 gm. potassium tert.-butylate in 15 cc. tetrahydrofuran was then introduced thereto dropwise in 30 minutes. After completion, the temperature was allowed to stand at about room temperature and under stirring water was added. The organic mixture was extracted three times with methylene chloride, the chloromethylenic phase was decanted, washed with water dried on sodium sulphate and evaporated to dryness under vacuum.

The residue consisting essentially of 2α,2β,17α-trimethyl-17β-tetrahydropyranyloxy derivative was used without further purification for the next step.

Step C.—The raw product obtained in the step B was dissolved in 12 cc., 75% acetic acid and warmed during 30 minutes at 60–70° C. The solution was then diluted with an equal volume of water and extracted three times with methylene chloride. After separation of the chloromethylenic solution and evaporation to dryness 2.46 gm. of 17β-hydroxylated derivative was obtained.

The raw product was purified by chromatography on a column charged with magnesium silicate and elution with methylene chloride. After evaporation, the residue weighed 2.1 gm. The 2α,2β,17α-trimethyl-17β-hydroxy-Δ$^{4,9,11}$-estratriene-3-one was recrystallized in isopropyl ether and gave 1.2 gm. of pure product melting at 137° C. and similar in all respects to the compound obtained in the Example I.

PHARMACOLOGICAL STUDY (A) Exogenic anti-androgenic activity

The exogenic antiandrogenic activity was determined vis-a-vis with testosterone propionate on castrated male rats using the method of Lerner as described by Dorfman [Methods in Hormones Research, Vol. II, p. 320].

Young male rats about 4 weeks old were castrated and the treatment began the next day and lasted for seven days. On the eighth day, the animals were sacrificed and the relevant organs, namely, the prostate, seminal vesicles and levator ani, were recovered. Testosterone propionate and 2,2,7α,17α-tetramethyl-Δ$^{4,9,11}$-estratriene-17β-ol-3-one were separately administered subcutaneously in solution in olive oil containing 5% benzylic alcohol at the doses set forth in Table 1. Four groups of rats were used: (1) controls receiving only the solvent, (2) rats receiving only 50γ of testosterone propionate, (3) rats receiving 200γ of the product of the invention and (4) rats receiving 200γ of the product of the invention plus 50γ of testosterone propionate. The results are in Table I.

TABLE I

| | Daily dose in γ/kg. | Fresh levator ani in mg. | Seminal vesicles in mg. | Prostate in mg. |
|---|---|---|---|---|
| Controls | 0 | 20.4 | 9.8 | 13.7 |
| Testosterone propionate | 50γ | 39.2 | 88.7 | 100.6 |
| Test product | 200γ | 31.5 | 16.5 | 37.5 |
| Test product plus Testosterone propionate | 200γ plus 50γ | 32.3 (−18%) | 52.1 (−41%) | 79.0 (−21%) |

The results in Table I show that 2,2,7α,17α-tetramethyl-Δ$^{4,9,11}$-estratriene-17β-ol-3-one has a strong antiandrogenic activity at a dose of 200γ vis-a-vis testosterone propionate.

The tests were repeated with the compounds and dosages set forth in the following tables.

TABLE II

| Treatment | Daily doses | Fresh levator ani in mg. | Seminal vesicles in mg. | Prostate in mg. |
|---|---|---|---|---|
| Controls | 0 | 18.4 | 6.8 | 6.6 |
| Testosterone propionate | 50γ | 42.4 | 62.6 | 104.3 |
| 2α,2β,17α-trimethyl-4-chloro-Δ$^{4,9,11}$-estratriene-17β-ol-3-one | 1 mg | 29.2 | 8.6 | 20.6 |
| 2α,2β,17α-trimethyl-4-chloro-Δ$^{4,9,11}$-estratriene-17β-ol-3-one plus Testosterone propionate | 1 mg plus 50γ | 32.9 (−23%) | 25.3 (−60%) | 41.2 (−61%) |

TABLE III

| Treatment | Daily doses | Fresh levator ani in mg. | Seminal vesicles in mg. | Prostate in mg. |
|---|---|---|---|---|
| Controls | 0 | 29.6 | 7.4 | 10.5 |
| Testosterone propionate | 50γ | 52.7 | 54.2 | 95.3 |
| 2α,2β,17α-trimethyl-4-chloro-Δ$^{4,9,11}$-estratriene-17β-ol-3-one | 50γ | 31.5 | 9.7 | 13.9 |
| 2α,2β,17α-trimethyl-4-chloro-Δ$^{4,9,11}$-estratriene-17β-ol-3-one plus Testosterone propionate | 50γ plus 50γ | 35.4 (−33%) | 50.3 (−7%) | 84.5 (−11%) |
| 2α,2β,17α-trimethyl-4-chloro-Δ$^{4,9,11}$-estratriene-17β-ol-3-one | 100γ | 27.7 | 9.6 | 15.6 |
| 2α,2β,17α-trimethyl-4-chloro-Δ$^{4,9,11}$-estratriene-17β-ol-3-one plus Testosterone propionate | 100γ plus 50γ | 46.8 (−11%) | 37.4 (−31%) | 64.1 (−33%) |

TABLE IV

| Treatment | Daily doses | Fresh levator ani in mg. | Seminal vesicles in mg. | Prostate in mg. |
|---|---|---|---|---|
| Controls | 0 | 24.9 | 8.2 | 11.5 |
| Testosterone propionate | 50γ | 42.9 | 57.3 | 97.0 |
| 2α,2β,17α-trimethyl-4-acetoxy-Δ$^{4,9,11}$-estratriene-17β-ol-3-one | 1 mg | 37.7 | 11.2 | 29.0 |
| 2α,2β,17α-trimethyl-4-acetoxy-Δ$^{4,9,11}$-estratriene-17β-ol-3-one plus Testosterone propionate | 1 mg plus 50γ | 49.0 | 40.9 (−28%) | 70.0 (−28%) |

The results of Tables II and III show that 2α,2β,17α-trimethyl - 4 - chloro - Δ$^{4,9,11}$-estratriene - 17β - ol-3-one has an important antiandrogenic activity at a dose of 100γ vis-a-vis 50γ of testosterone propionate. Although the antiandrogenic activity of 2α,2β,17α-trimethyl-4-acetoxy-Δ$^{4,9,11}$-estratriene-17β-ol-3-one is weaker, it nevertheless has an effective activity at a daily dose of 1 mg.

(B) Anti-gonadotrophic activity

The anti-gonadotrophic was determined on puberic rats weighing about 200 grams by subcutaneously administering the test compounds in solution in sesame oil containing 5% benzylic alcohol.. The animals received a volume of 0.2 cc., in 12 treatments over 14 days at daily dosages of 500γ and 2 mg. the first day and 200γ and 1 mg. the second day. On the fourteenth day, the animals were sacrificed by carotidiene bleeding and the seminal vesicles, prostate, testicles and surrenals were retained and weighed. The results are given in Table V.

4. A compound of claim 1 which is 2α,2β,17α-trimethyl - 17β - methoxy - Δ$^{4,9,11}$ - estratriene-3-one.

5. A compound of claim 1 which is 2α,2β,17α-trimethyl - 13β - ethyl - Δ$^{4,9,11}$ - gonatriene-17β-ol-3-one.

6. A compound of claim 1 which is 2α,2β,7α,17α-tetramethyl-Δ$^{4,9,11}$-estratriene-17β-ol-3-one.

7. A compound of claim 1 which is 2α,2β,17α-trimethyl-4-chloro-Δ$^{4,9,11}$-estratriene-17β-ol-3-one.

8. A compound of claim 1 which is 2α,2β,17α-trimethyl-Δ$^{4,9,11}$-estratriene-4,17β-diol-3-one.

9. A compound of claim 1 which is 2α,2β,17α-trimethyl-4-acetoxy-Δ$^{4,9,11}$-estratriene-17β-ol-3-one.

10. A process for the preparation of a compound of claim 1 wherein $R_1$ is hydrogen which comprises reacting a 17α - methyl - 13β - R - Δ$^{4,9,11}$ - gonatriene-17β-ol-one

TABLE V

|  | Daily doses | Testilces in mg. | Seminal vesicles in mg. | Prostate in mg. | Surrenals in mg. |
|---|---|---|---|---|---|
| Controls | 0 | 2,900 | 761.6 | 462.6 | 42. |
| 2α, 2β, 17α-trimethyl-4-chloro-Δ$^{4,9,11}$-estratriene-17β-ol-3-one | 500γ | 2,700 | 610.7 (−20%) | 309.8 (−33%) | 34.5 (−21%) |
|  | 2 mg | 2,700 | 559.3 (−27%) | 326.6 (−21%) | 30.6 (−28%) |
| Controls | 0 | 2,950 | 629.6 | 352.8 | 47.8 |
| 2α,2β,17α-trimethyl-4-acetoxy-Δ$^{4,9,11}$-estratriene-17β-ol-3-one | 200γ | 3,030 | 694.9 | 385.1 | 42.4 |
|  | 1 mg | 3,000 | 560.9 | 372.4 | 50.6 |

The results of Table V show that the two test compounds do not possess an anti-gonadotrophic activity.

Various modifications of the compositions and method of the invention may be made without departing from the spirit or scope thereof and it is to be understood that the invention is to be limited only as defined in the appended claims.

We claim:

1. A compound of the formula

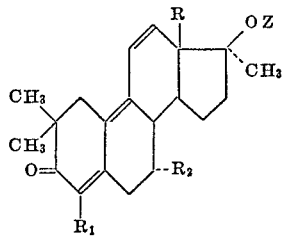

wherein Z is hydrogen, alkyl of 1 to 6 carbon atoms or tetrahydropyranyl, R is alkyl of 1 to 4 carbon atoms and $R_1$ is selected from the group consisting of hydrogen, hydroxy, lower alkanoyloxy of 1 to 7 carbon atoms and halogen, and $R_2$ is hydrogen or alkyl of 1 to 4 carbon atoms.

2. A compound of claim 1 wherein R is methyl or ethyl.

3. A compound of claim 1 which is 2α,2β,17α-trimethyl - 17β - tetrahydropyranyloxy - Δ$^{4,9,11}$ - estratriene - 3-one.

where R has the definition of claim 1 with a lower alkyl formate in the presence of an alkali metal agent selected from the group consisting of alkali metal hydrides and amides to form the alkali metal salt of 2-formyl-17α-methyl - 13β - R - Δ$^{4,9,11}$ - gonatriene-17β-ol-3-one and reacting the latter with a methyl halide in the presence of an alkaline agent selected from the group consisting of alkali metal hydrides and alkali metal tert.-alcoholates to form the corresponding 2α,2β,17α-trimethyl-13β-R-Δ$^{4,9,11}$-gonatriene-17β-ol-3-one.

11. The process of claim 10 wherein the alkyl formate was ethyl formate and the alkali metal agent was sodium hydride.

12. The process of claim 10 wherein the methyl halide is methyl iodide and the alkaline agent is an alkali metal tert.-alcoholate.

References Cited

UNITED STATES PATENTS 3,041,359   6/1962   Ringold et al.   260—397.3
3,068,248   12/1962   Camerino et al.   260—397.4
3,248,294   4/1966   Nomine et al.   167—74

OTHER REFERENCES

Deferassi, Steroid Reactions pp. 206 and 608 (1963).

HENRY A. FRENCH, Primary Examiner

U.S. Cl. X.R.

260—397.45; 424—241, 243